(12) United States Patent
Lee

(10) Patent No.: US 10,291,277 B2
(45) Date of Patent: May 14, 2019

(54) SECURE PORTABLE PATROL SYSTEM

(71) Applicant: AMobile Intelligent Corp. Limited, Kowloon OT (HK)

(72) Inventor: Min Lee, New Taipei (TW)

(73) Assignee: AMOBILE INTELLIGENT CORP. LIMITED, Kowloon (HK)

( * ) Notice: Subject to any disclaimer, the term of this patent is extended or adjusted under 35 U.S.C. 154(b) by 0 days.

(21) Appl. No.: 15/426,373

(22) Filed: Feb. 7, 2017

(65) Prior Publication Data

US 2018/0227007 A1 Aug. 9, 2018

(51) Int. Cl.
| | |
|---|---|
| H04B 1/3827 | (2015.01) |
| H04N 5/33 | (2006.01) |
| H04N 5/232 | (2006.01) |
| H04W 4/00 | (2018.01) |
| G01J 5/10 | (2006.01) |
| G01J 5/08 | (2006.01) |
| H04W 4/80 | (2018.01) |
| G01J 5/02 | (2006.01) |
| G01J 5/04 | (2006.01) |
| G01J 5/00 | (2006.01) |

(52) U.S. Cl.
CPC ............ *H04B 1/3833* (2013.01); *G01J 5/025* (2013.01); *G01J 5/028* (2013.01); *G01J 5/0265* (2013.01); *G01J 5/04* (2013.01); *G01J 5/0806* (2013.01); *G01J 5/10* (2013.01); *H04N 5/23293* (2013.01); *H04N 5/33* (2013.01); *H04W 4/80* (2018.02); *G01J 2005/0077* (2013.01)

(58) Field of Classification Search
None
See application file for complete search history.

(56) References Cited

U.S. PATENT DOCUMENTS

| | | | |
|---|---|---|---|
| 8,374,438 B1* | 2/2013 | Wagner | H04N 5/33 250/330 |
| 2002/0137505 A1* | 9/2002 | Eiche | B60R 11/0241 455/425 |
| 2006/0229114 A2* | 10/2006 | Kim | B60R 25/102 455/575.1 |
| 2014/0233180 A1* | 8/2014 | Vargas | G06F 1/1613 361/679.55 |
| 2015/0339905 A1* | 11/2015 | Stevens | G08B 21/02 340/4.1 |
| 2016/0149605 A1* | 5/2016 | Vecera | H04B 1/3816 455/558 |

(Continued)

*Primary Examiner* — Frederick D Bailey
(74) *Attorney, Agent, or Firm* — Muncy, Geissler, Olds & Lowe, P.C.

(57) ABSTRACT

A secure portable patrol system including a portable patrol device and a base unit is revealed. The patrol device is a portable rectangular body disposed with a multi-image display screen on a front surface thereof. The patrol device is disposed with an IR image capture unit, a wireless call unit and a first SIM card communication unit so that users can perform multiple tasks by the single patrol device such as checking whether there is area that overheats or abnormal conditions that occur. The base unit includes a specific transmitter while the patrol device is set with a specific port for electrical connection to the specific transmitter. Thereby the patrol device and the base unit are electrically connected for secure data transmission.

5 Claims, 13 Drawing Sheets

(56) References Cited

U.S. PATENT DOCUMENTS

2016/0171504 A1* 6/2016 Harriman ............. G06Q 30/012
                                                      348/143
2017/0124853 A1* 5/2017 Mehta ..................... H04W 4/90
2017/0144613 A1* 5/2017 Catlin ................. B60R 11/0241

* cited by examiner

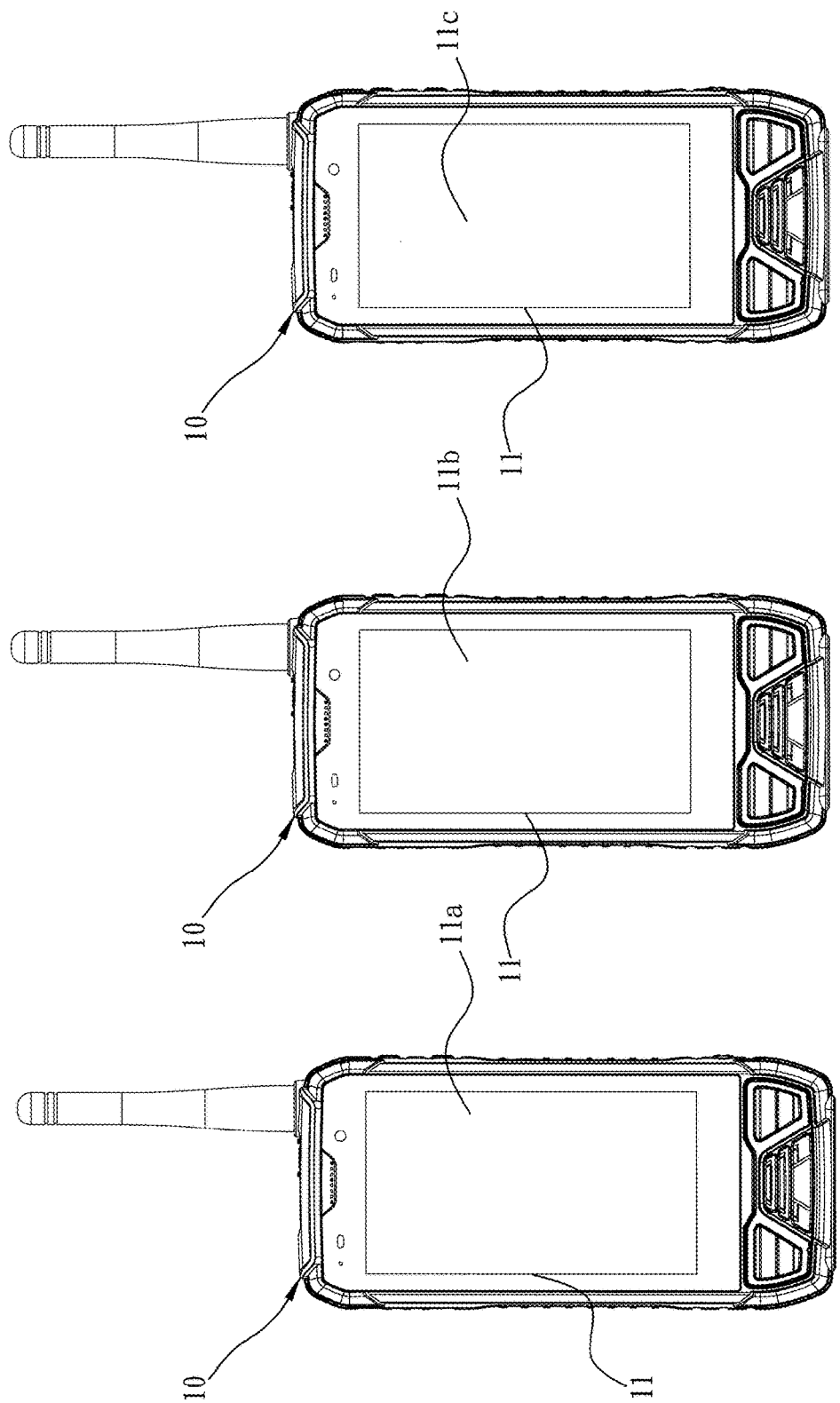

SECURE PORTABLE PATROL SYSTEM

BACKGROUND OF THE INVENTION

The present invention relates to a patrol system, especially to a secure portable patrol system that allows users to carry with them for providing patrol and inspection services at a remote end and checking whether there is area that overheats or abnormal conditions that occurs within patrol zone through an infrared image capture unit and a display screen thereof.

With advanced science and technology, stock clerks, firemen, and oil pipe/cable inspection staff can not only patrol a large area and conduct a detailed inspection but also keep contact with other security staff/control room and upload data obtained to the cloud host by various kinds of equipment including temperature sensors, wireless interphones and mobile phones. The patrol system with such design allows a single patrol officer to complete multiple tasks so that the labor cost can be reduced.

However, users need to carry a plurality of remote units at the same time for patrolling and inspection with the above patrol system. Each unit has different functions so that users take efforts to remove and replace the unit while performing different tasks. Thus the working efficiency is reduced and the loading of the equipment is heavy. This room for improvement and there is a need to provide a novel patrol system.

SUMMARY OF THE INVENTION

Therefore it is a primary object of the present invention to provide a secure portable patrol system that includes a portable patrol device and a base unit located at a terminal end and electrically connected to the patrol device. The patrol device consists of an infrared (IR) image capture unit, a wireless call unit and a first SIM card communication unit. Users only need to carry the patrol device for performing multiple tasks at a remote site. For example, users can check and see whether there is extremely hot area or abnormal conditions through the IR image capture unit and a display screen of the patrol device. Moreover, secure transmission of the data obtained after patrolling is achieved by internal settings of the patrol device.

In order to achieve the above object, a secure portable patrol system according to the present invention includes a portable patrol device and a base unit. The patrol device is a portable rectangular body disposed with a multi-image display screen on a front surface thereof. The patrol device is disposed with an IR image capture unit, a wireless call unit and a first SIM card communication unit. The IR image capture unit composed of a thermal imaging lens and an imaging lens is arranged at a rear surface of the patrol device. The wireless call unit consists of a receiver portion set on an upper part of the front surface of the patrol device, a transmitter portion arranged at a lower part of the front surface of the patrol device and a talk button disposed on a side surface of the patrol device. The first SIM card communication unit includes a first SIM card. The base unit includes a specific transmitter while the patrol device includes a specific port set on a bottom surface thereof for electrical connection to the specific transmitter of the base unit. Thus the patrol device and the base unit are electrically connected for secure data transmission.

BRIEF DESCRIPTION OF THE DRAWINGS

FIG. 16-FIG. 21 are schematic drawings showing a display screen of different embodiments according to the present invention.

DETAILED DESCRIPTION OF THE PREFERRED EMBODIMENTS

Figure 1:
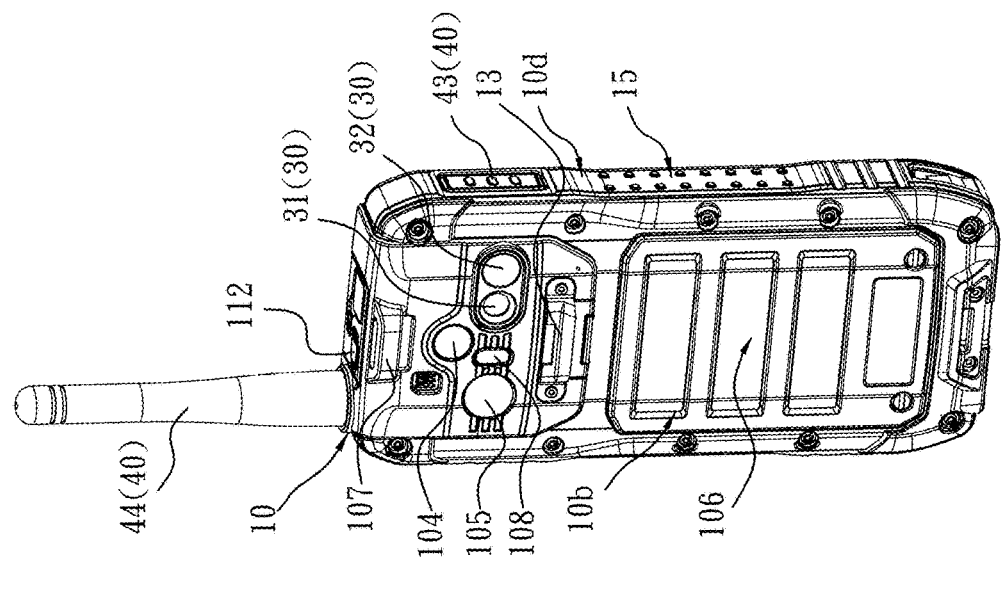
FIG. 1 is a front view of an embodiment according to the present invention.

Refer from FIG. 1 to FIG. 7, a secure portable patrol system 1 of the present invention includes a patrol device 10 and a base unit 20.

The patrol device 10 is a portable rectangular body having a front surface 10a, a rear surface 10b, a right side surface 10c, a left side surface 10d, a top surface 10e and a bottom surface 10f. A display screen 11 is disposed on the front surface 10a and used for users to select and run modes thereon.

The right side surface 10c and the left side surface 10d are arranged with a slip-resistant portion 15 respectively for preventing the patrol device 10 from slipping out of user's hand.

Figure 15:
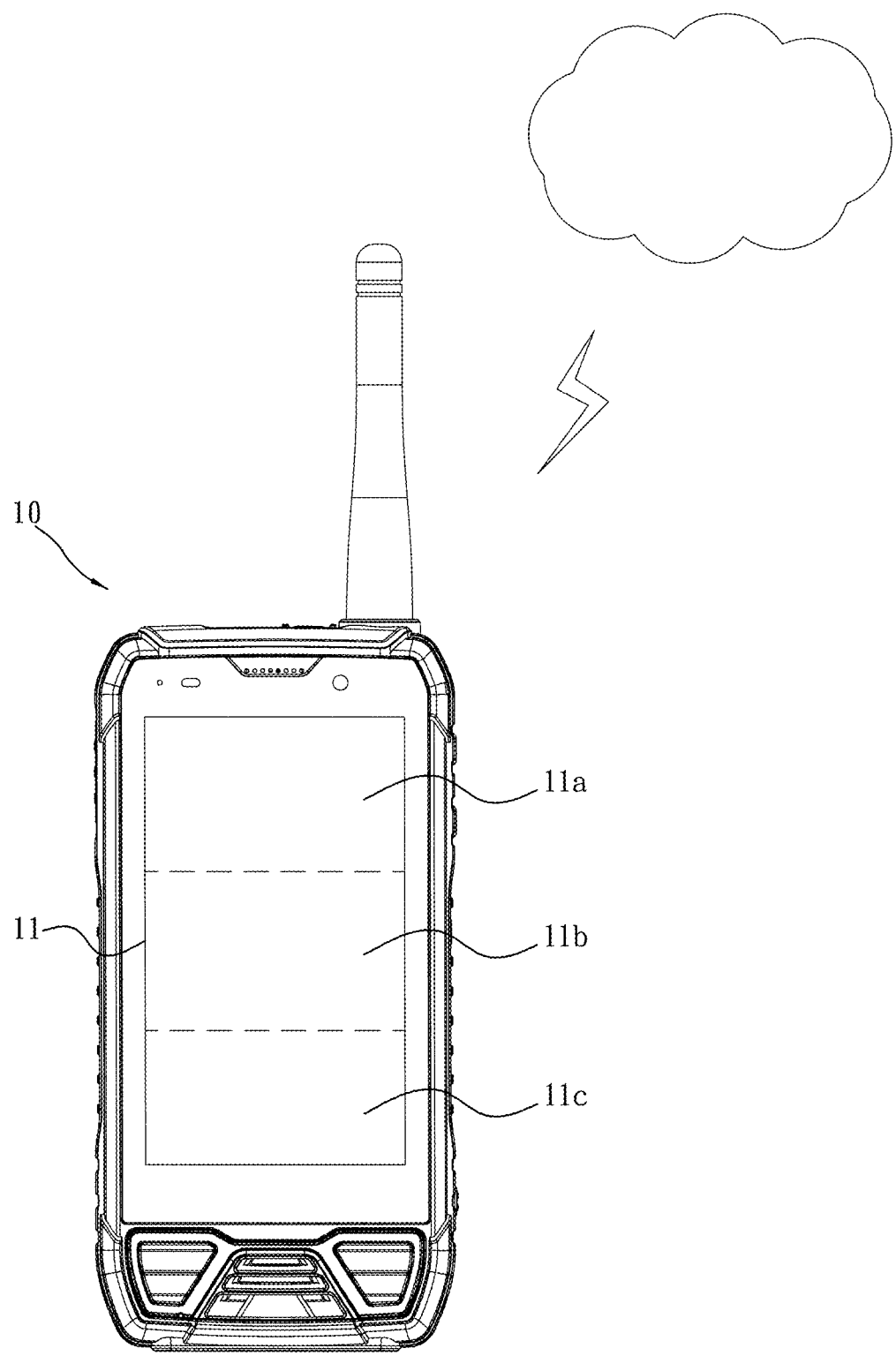
FIG. 15 is a schematic drawing showing secure data transmission according to the present invention.
Figure 18:
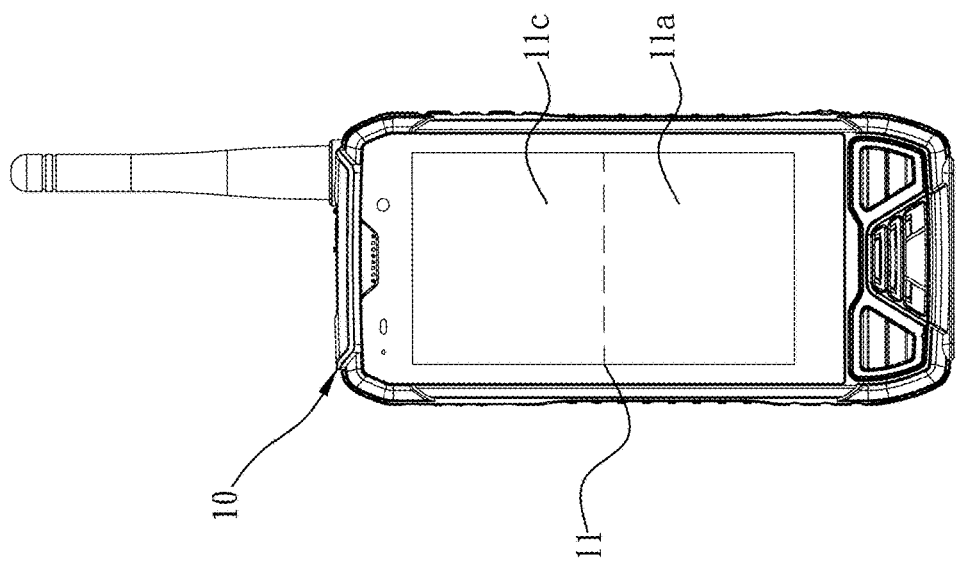
Figure 17:
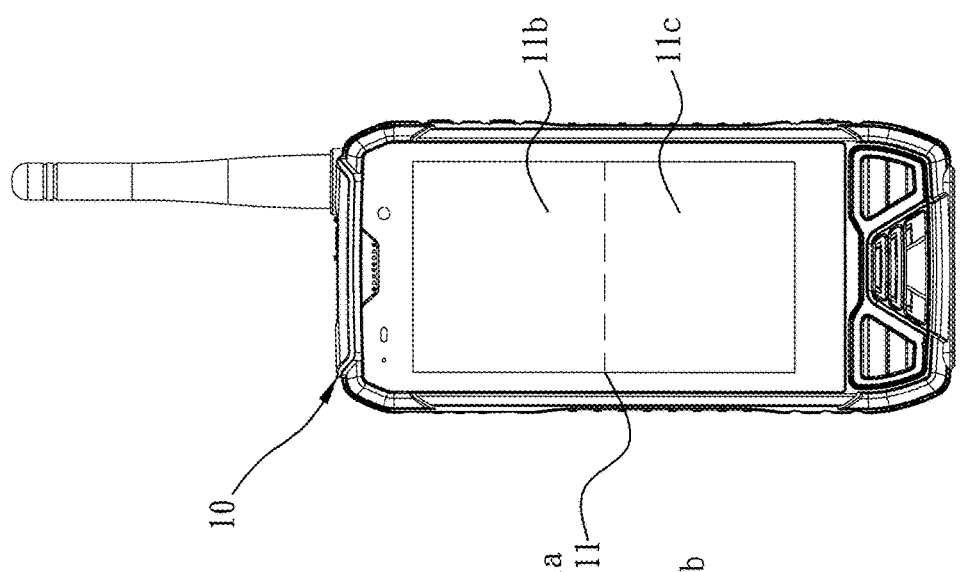
Figure 16:
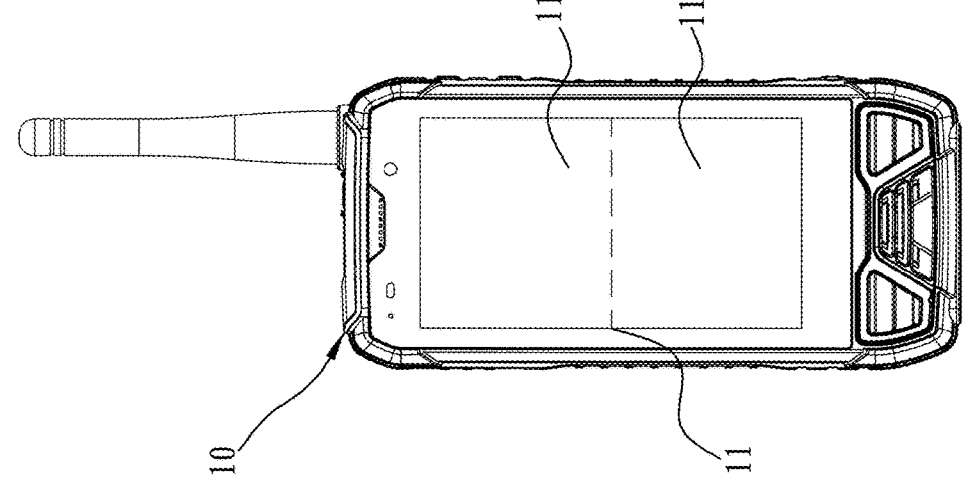

The patrol device 10 is further arranged with an infrared (IR) image capture unit 30, a wireless call unit 40 and a first SIM card communication unit 50. The IR image capture unit 30 is set on the rear surface 10b of the patrol device 10 and composed of a thermal imaging lens 31 and an imaging lens 32. The thermal imaging lens 31 gets a thermal image 11a (as shown in FIG. 15) while the IR image capture unit 30 performs temperature detection. At the same time, the imaging lens 32 obtains a common image 11b (as shown in FIG. 15). The thermal image 11a, the common image 11b and a synthesized image 11c created by the thermal image 11a and the common image 11b are synchronously shown on the display screen 11 from top to bottom in turn, as shown in FIG. 15, but not limited to this way. Users can select and set the images, 11a, 11b, 11 as shown on the display screen 11. For example, two images are displayed in parallel. Refer to FIG. 16, the thermal image 11a and the common image 11b are displayed. Or refer to FIG. 17, the common image 11b and the synthesized image 11c are displayed. Or the synthesized image 11c and the thermal image 11a are displayed, as shown in FIG. 18. Or only one image is displayed. Refer to FIG. 19, only the thermal image 11a is shown on the display screen 11. Refer to FIG. 20, the common image 11b is displayed. Or only the synthesized image 11c is displayed, as shown in FIG. 21.

Figure 2:
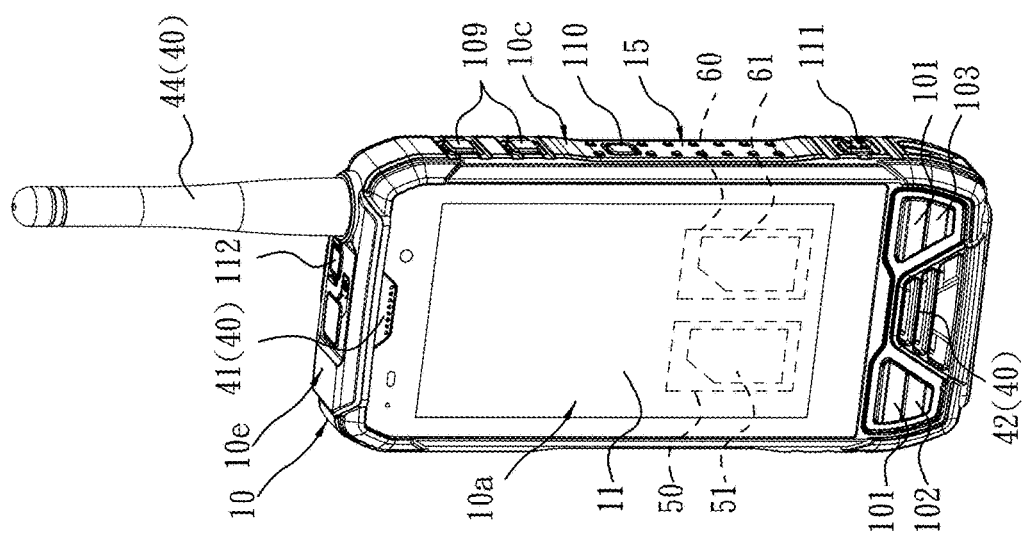
FIG. 2 is a rear view of the embodiment in FIG. 1 according to the present invention.
Figure 3:
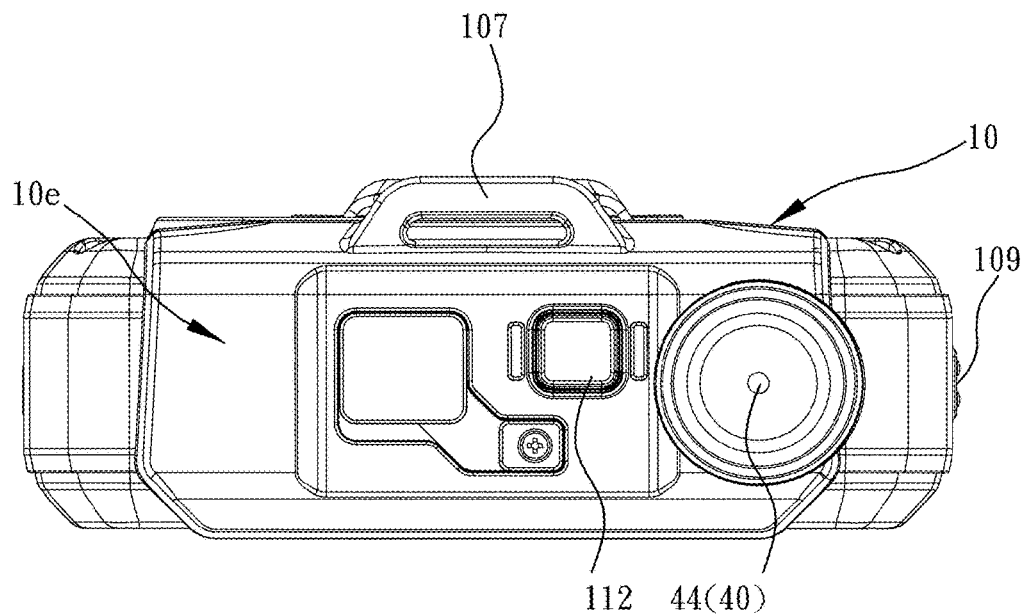
FIG. 3 is a top view of the embodiment in FIG. 1 according to the present invention.
Figure 4:
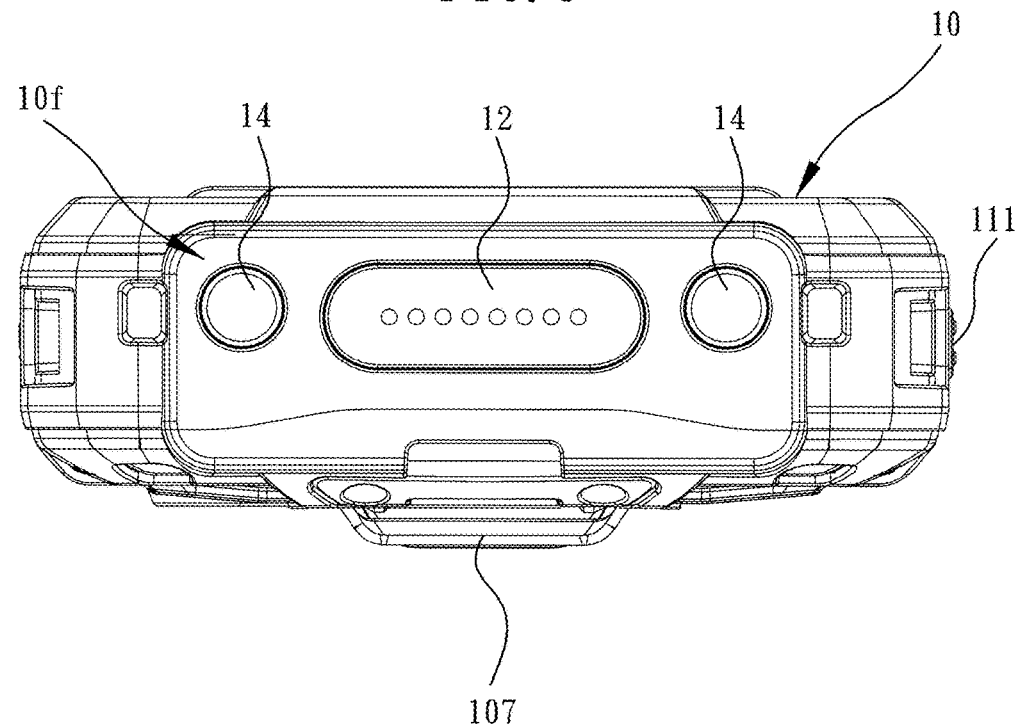
FIG. 4 is a bottom view of the embodiment in FIG. 1 according to the present invention.
Figure 5:
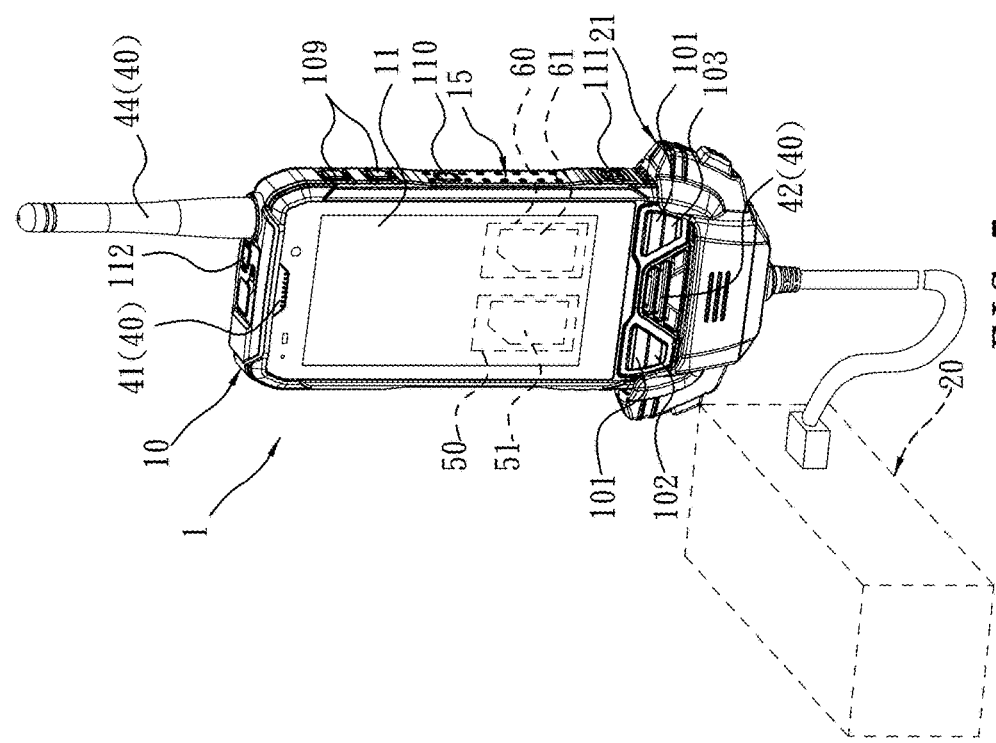
FIG. 5 is a schematic drawing showing a front view of an embodiment in use according to the present invention.

The wireless call unit 40 consists of a receiver portion 41, a transmitter portion 42 and a talk button 43a. The receiver portion 41 is set on an upper part of the front surface 10a and used for receiving wireless messages. The transmitter portion 42 is arranged at a lower part of the front surface 10a and the talk button 43a is disposed on the left side surface 10d. As shown in FIG. 2 and FIG. 5, users can make a wireless call from the transmitter portion 42 to the base unit 20 by pressing the talk button 43a.

As shown in FIG. 1, the wireless call unit 40 further includes an antenna 44 disposed on the top surface 10e of the patrol device 10 and used for enhancing strength of signals received by the wireless call unit 40.

Still refer to FIG. 1, the first SIM card communication unit 50 includes a first SIM card 51. When users install a SIM card used in local area as the first SIM card 51 in the first SIM card communication unit 50, image information is transmitted and received through network services in that area (as shown in FIG. 15). The image information is stored in a secret folder by settings and protected by encryption so that the image information can only be transmitted to a specific cloud host. Thus the image information will not be transmitted openly.

Refer to FIG. 1, the patrol device 10 further includes a second SIM card communication unit 60 used for mounting a second SIM card 61 whose area specification is different from that of the first SIM card 51 mounted in the first SIM card communication unit 50. When the first SIM card 51 mounted in the first SIM card communication unit 50 is unable to be used at different area/locations, the patrol device 10 uses the second SIM card communication unit 60 for connection to network. The second SIM card communication unit 60 can be, but not limited to, further set to be connected to intranet only. The network that the patrol device 10 is connected to should have encryption capabilities so that data/information is encrypted while being transmitted across the network.

The second SIM card communication unit 60 further supports other wireless communication standards such as Wi-Fi, NFC (Near Field Communication) and Bluetooth for communication with others (as shown in FIG. 15). Thus the patrol device 10 has diversified wireless communication applications.

Refer from FIG. 1 to FIG. 4, the patrol device 10 further includes two function key sets 101, one record key 102, one upload button 103, a red light laser pointer 104, a main lens 105, a Radio-frequency identification (RFID) reader 106, a hook 107, a LED (light emitting diode) light 108, a volume control key set 109, a power switch 110, a camera button 111, and an alarm button 112. The function key sets 101 are disposed on the front surface 10a and under the display screen 11 and able to be set as hot keys by users for easy control of the patrol device 10. The record key 102 is also arranged at the front surface 10a and under the display screen 11. Users can press the record key 102 to activate recording program and the record key 102 is switched to the on/off button for control of recording after the recording program being activated. The upload button 103 set on the front surface 10a and under the display screen 11 is used for upload data in specific folder to the designated cloud whenever needed. The red light laser pointer 104 is disposed on the rear surface 10b, located beside the thermal imaging lens 31 and used for users to point a red laser at a measuring point that requires temperature measurement. The main lens 105 is arranged at the rear surface 10b and located beside the thermal imaging lens 31 for users to capture images. The RFID reader 106 disposed on the rear surface 10b and located under the thermal imaging lens 31 allows users to get barcode data by sending signals to a tag and reading its response. The hook 107 is set on the rear surface 10b and located above the thermal imaging lens 31. Users can hang the patrol device 10 on a supporting member by the hook 107. The LED light 108 is disposed on the rear surface 10b and located beside the thermal imaging lens 31 for users to light the surroundings. The volume control key set 109 is arranged at the right side surface 10c and used for users to adjust sound volume of the patrol device 10. The power switch 110 is set on the right side surface 10c and used for users to turn on/off power of patrol device 10. The camera button 111 is disposed on the right side surface 10c of the patrol device 10 and used for taking a shot. As to the alarm button 112, it is mounted on the top surface 10e and beside the antenna 44 for users to call for help (such as send signal to the base unit or dial the emergency telephone number automatically).

Refer from FIG. 4 to FIG. 7, the base unit 20 includes a specific transmitter 21 while the patrol device 10 includes a specific port 12 disposed on the bottom surface 10f thereof and used for electrical connection to the specific transmitter 21. Thus the patrol device 10 and the base unit 20 are electrically connected for secure data transmission.

Figure 6:
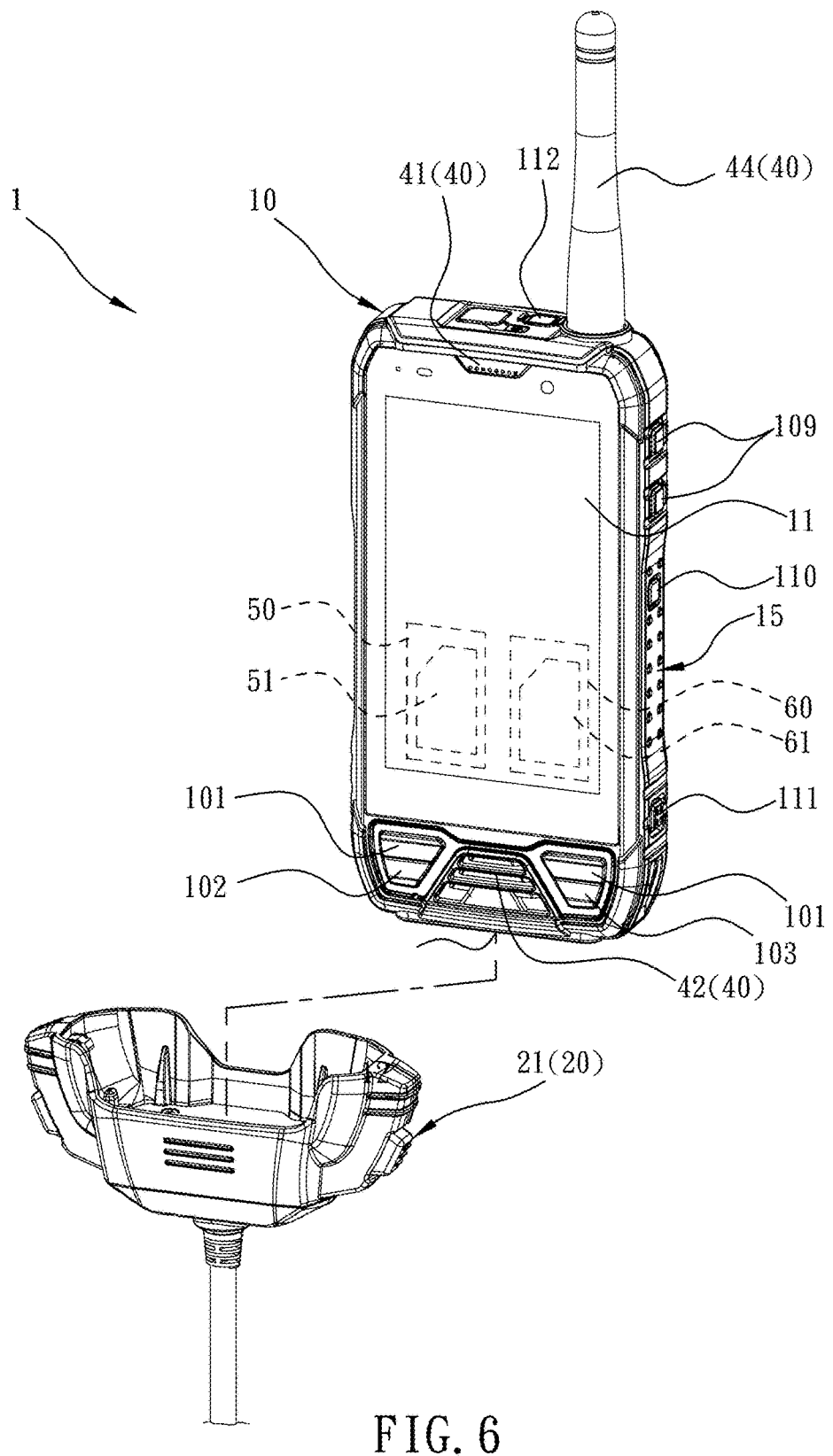
FIG. 6 is an explosive view of the embodiment in FIG. 5 according to the present invention.
Figure 8:
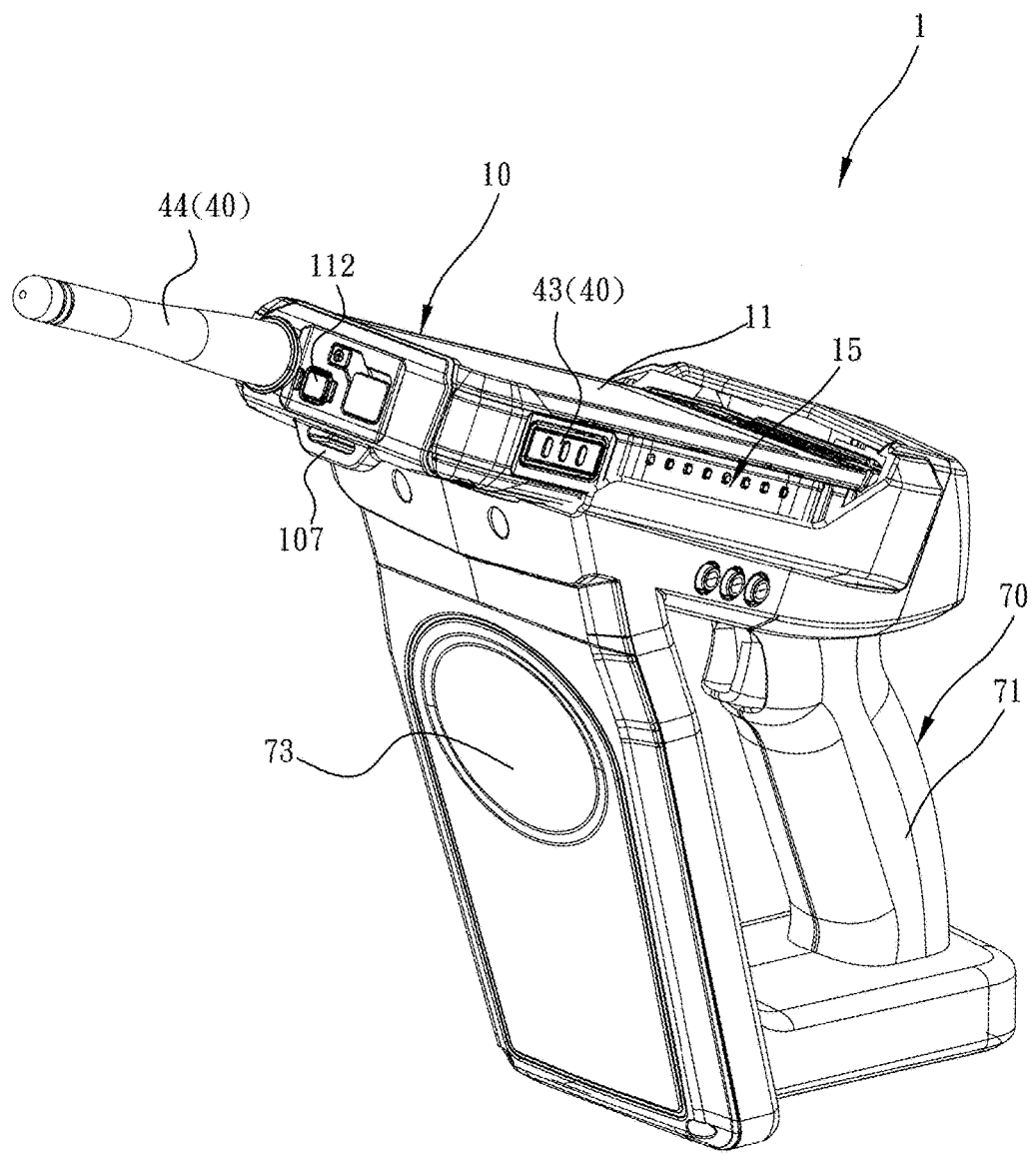
FIG. 8 is a perspective view of another embodiment in use according to the present invention.
Figure 9:
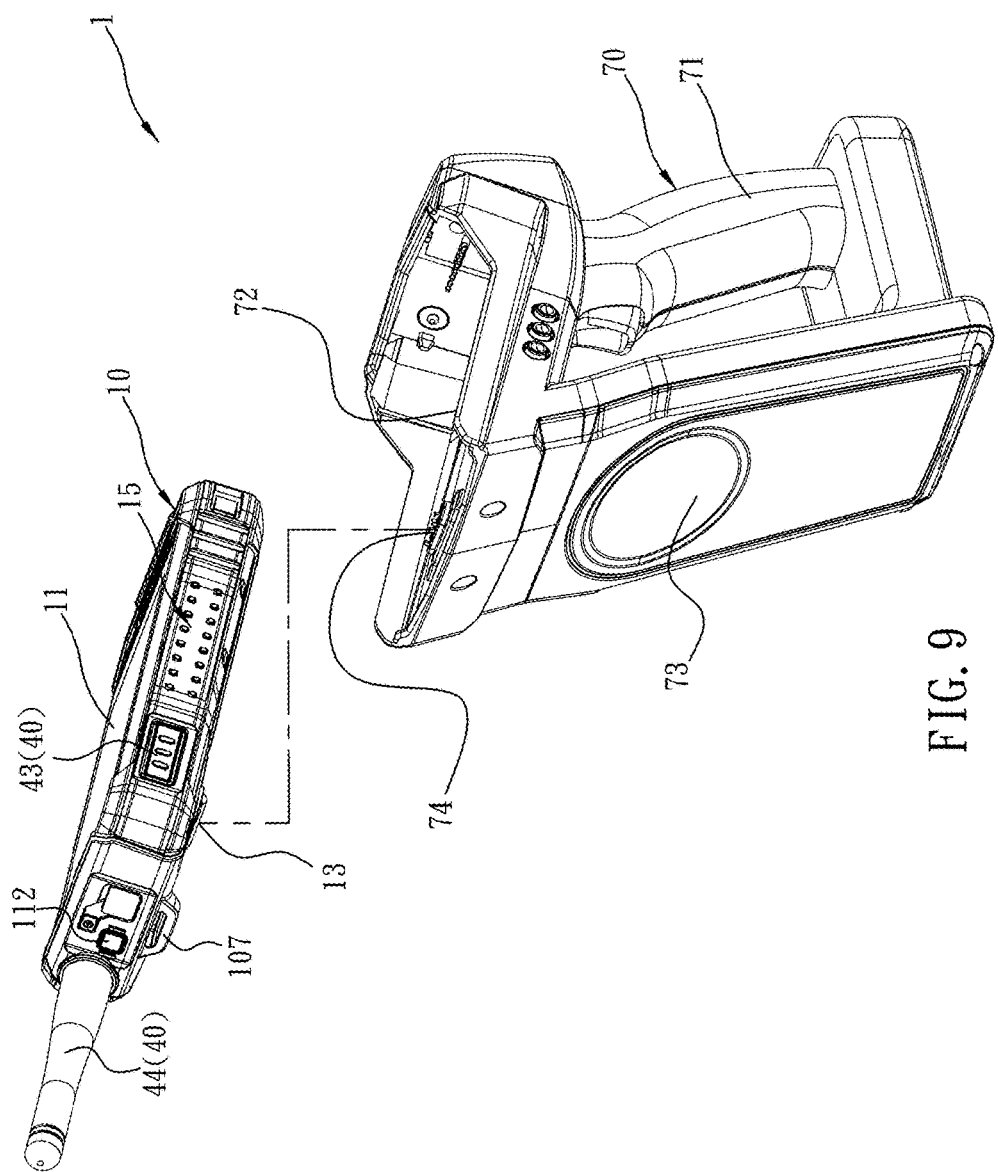
FIG. 9 is an explosive view of the embodiment in FIG. 8 according to the present invention.
Figure 10:
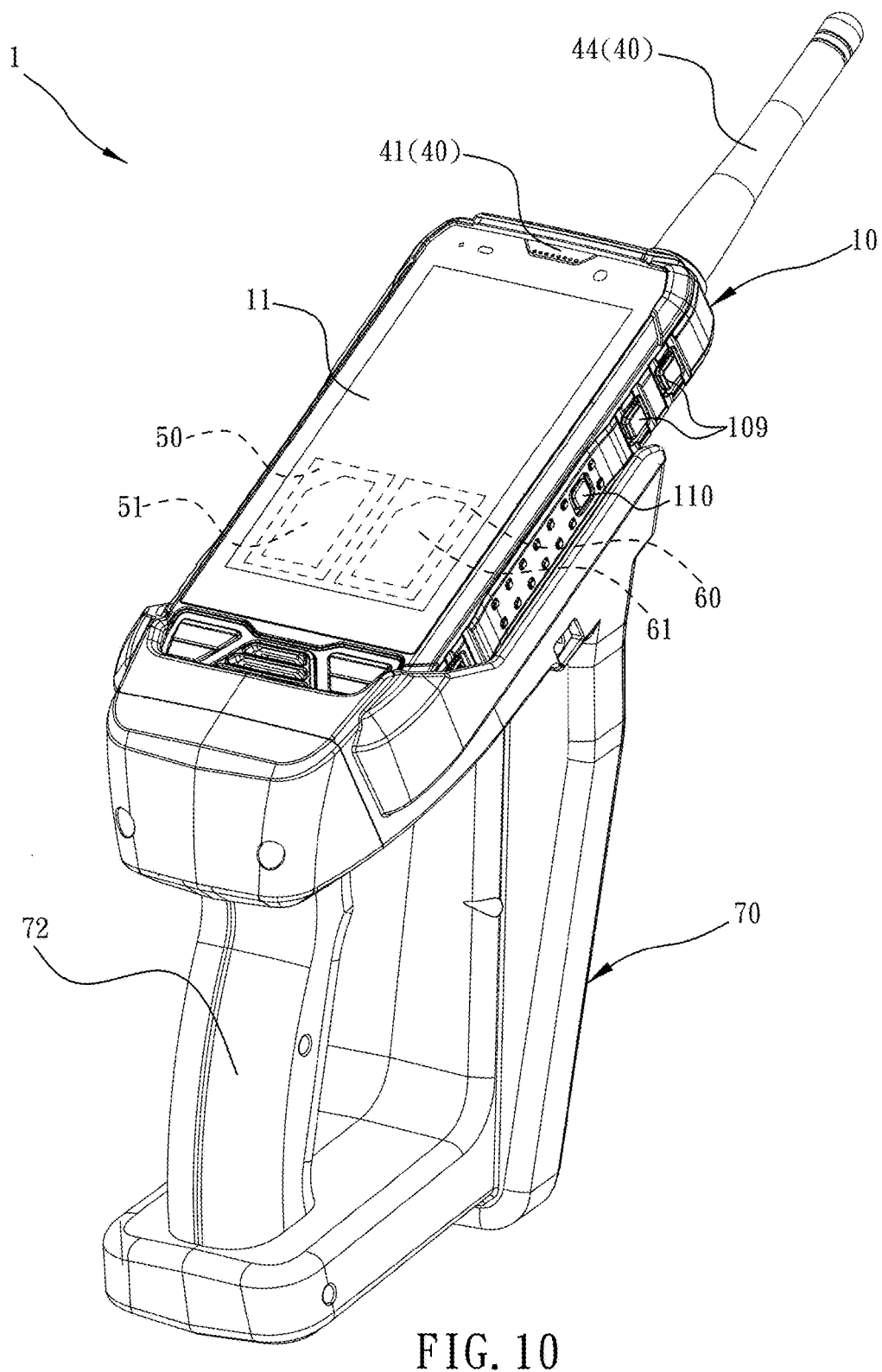
FIG. 10 is another perspective view of the embodiment in FIG. 8 according to the present invention.
Figure 11:
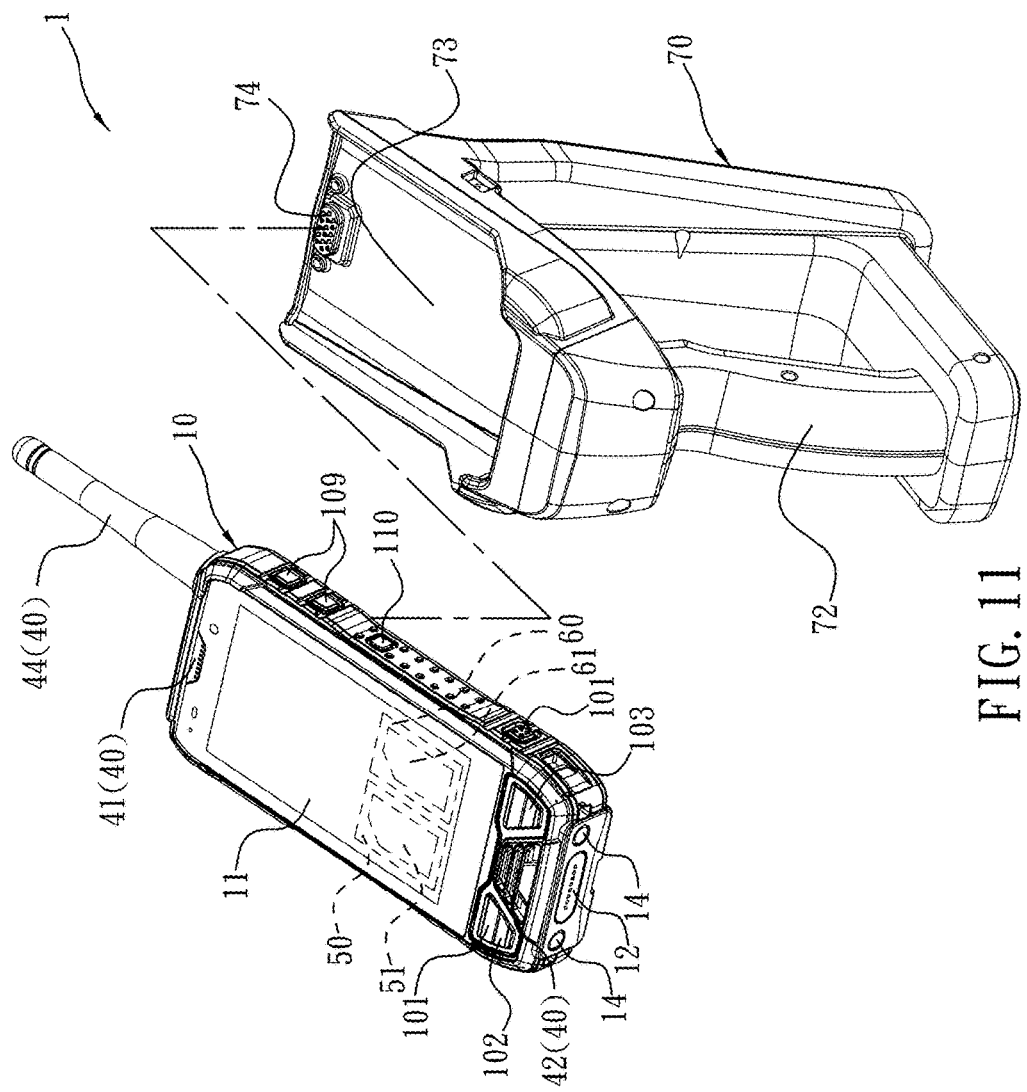
FIG. 11 an explosive view of the embodiment in FIG. 10 according to the present invention.
Figure 14:
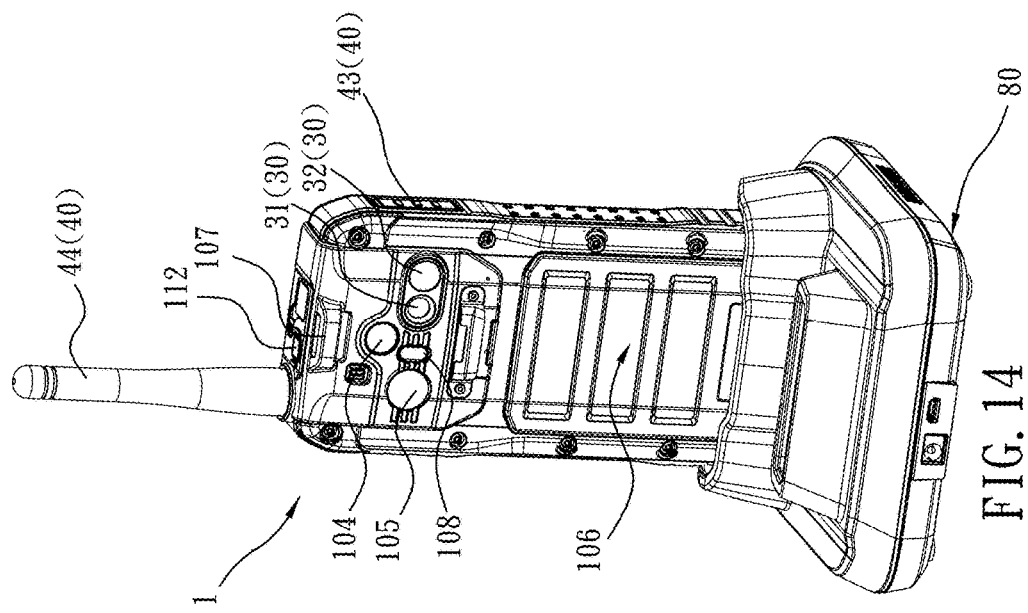
FIG. 14 is a perspective view showing a rear side of the embodiment in FIG. 12 according to the present invention.
Figure 12:
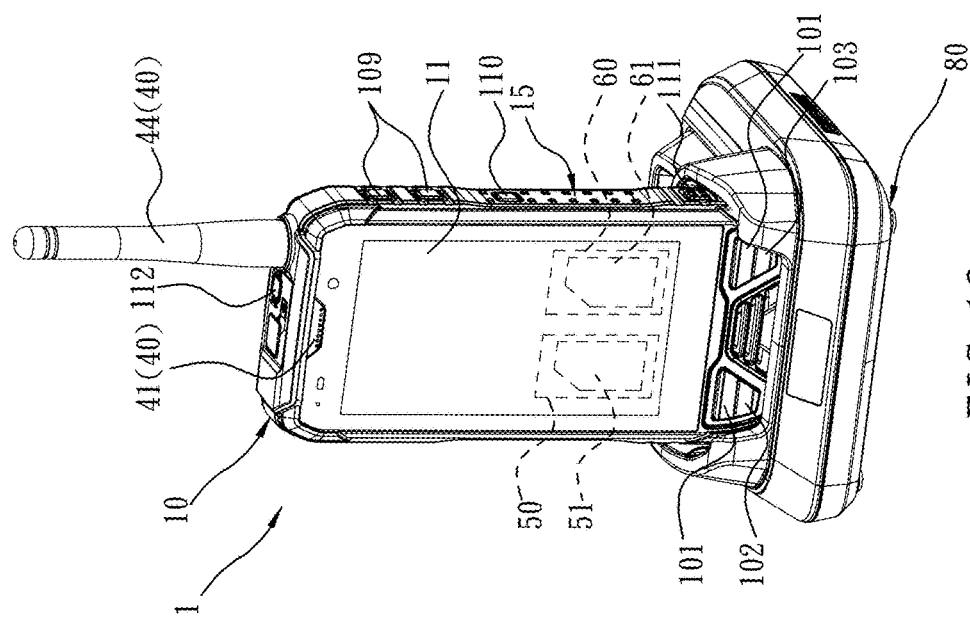
FIG. 12 is a perspective view showing a front side of a further embodiment according to the present invention.
Figure 13:
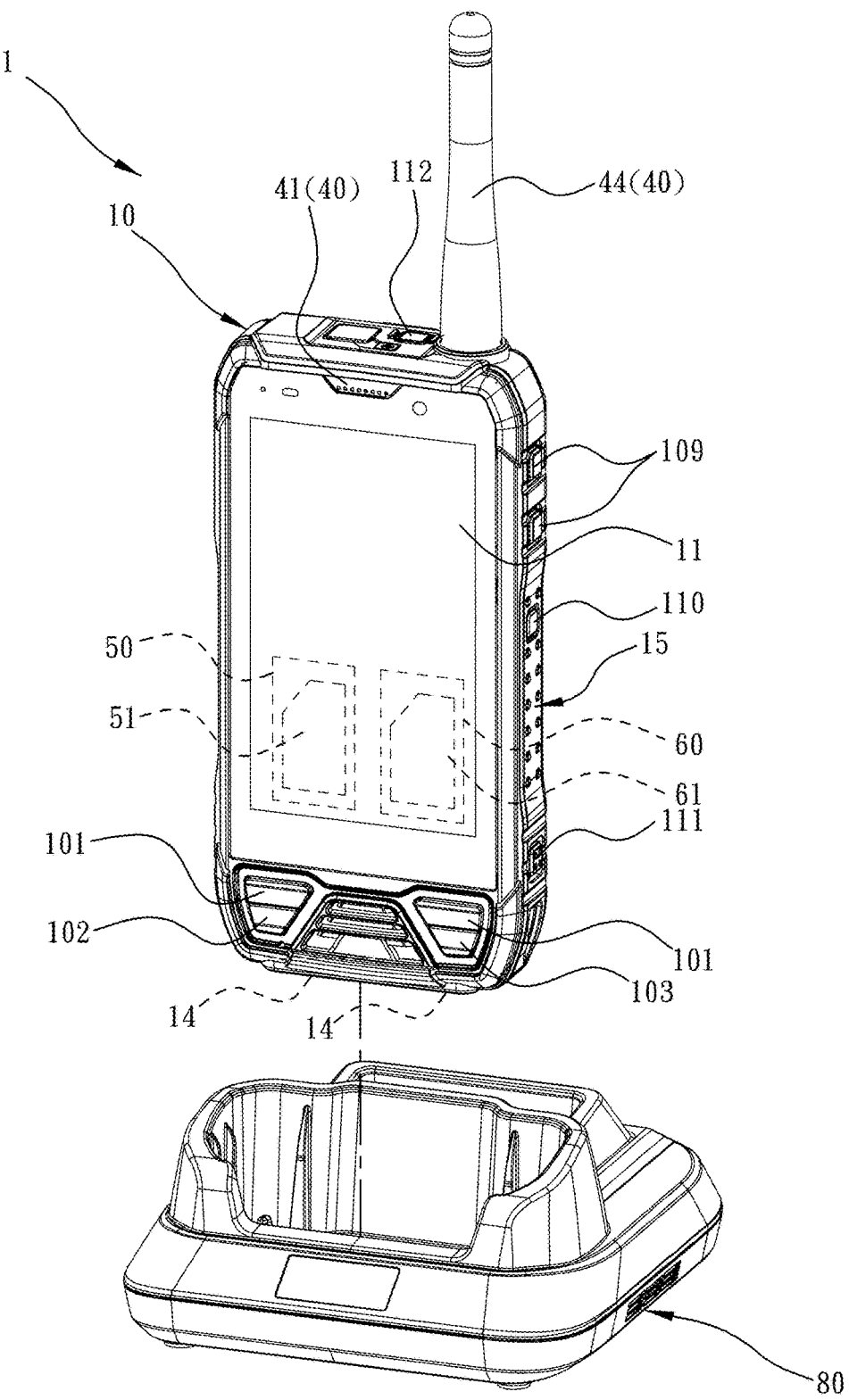
FIG. 13 is an explosive view of the embodiment in FIG. 12 according to the present invention.

As shown in FIG. 6, users can select and run programs (such as application software) by the display screen 11 on the patrol device 10 or they can press the respective function key on the patrol device 10 for temperature measurement and wireless communication (such as radio broadcasting, network, etc.) while they are away from the base unit 20 and carrying the patrol device 10 with them to perform patrol and inspection duties. Thus users can get images and communicate with the base unit 20 in a real-time manner.

Figure 7:
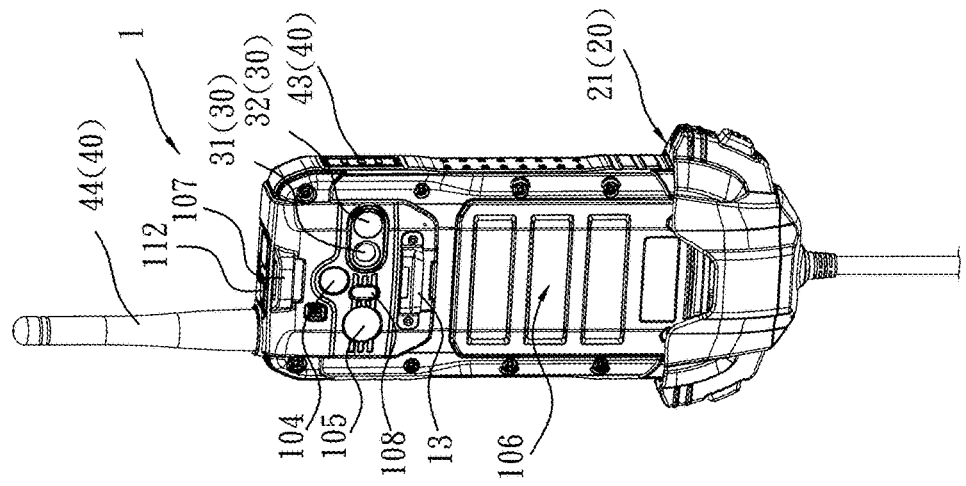
FIG. 7 is a rear view of the embodiment in FIG. 5 according to the present invention.

Refer to FIG. 5 and FIG. 7, the patrol device 10 is electrically connected to the base unit 20 by electrical connection of the specific transmitter 21 when the patrol device 10 is turned back to the base unit 20 after completing inspections.

The base unit 20 includes a least one computer and related external peripherals such as a printer, a mobile phone, a projector, etc.

Refer to FIG. 2, FIG. 8, FIG. 9, FIG. 10 and FIG. 11, the rear surface 10b of the patrol device 10 is disposed with a pistol-grip connector 13. The pistol-grip connector 13 is used for electrical connection to a pistol-grip guard tour device 70. The guard tour device 70 is composed of a handle 71, a seat 72, a sensing surface 73 and a connection port 74. The patrol device 10 is electrically connected to the connection port 74 by the pistol-grip connector 13 thereof and is able to be mounted in into the seat 72. Then users can hold the handle 71 and perform patrol inspections by the sensing surface 73. Next the inspection data obtained after the guard tour is transmitted back to the base unit 20 through the patrol device 10.

Refer to FIG. 4, FIG. 12, FIG. 13 and FIG. 14, the bottom surface 10f of the patrol device 10 is set with a charging port 14 that is electrically connected to a charging stand 80 for charging the patrol device 10.

In summary, the secure portable patrol system 1 of the present invention has the following advantages compared with techniques available now.

(1) The functions of temperature measurement and wireless communication can be provided simultaneously by selecting programs on the display screen 11 or pressing the respective function key on the patrol device 10 while the user carries the patrol device 10. For example, security staff can find out problems such as some area that overheat alarmingly by temperature detection/measurement and then report to control staff with the base unit 20 (in a central monitoring room) immediately while checking cables or oil pipelines. Thereby the base unit 20 turns off the wires or the pipelines with problems in real time so that the following disasters and damages that may occur can be reduced effectively. The working efficiency is improved.

(2) The user only need to carry one device for performing different tasks such as photo shooting, giving an alarm, uploading data, wireless communication, sound control and power on/off, etc. Thus the loading of the equipment is reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A secure portable patrol system (1) comprising:
a patrol device (10); and
a base unit (20);
wherein the patrol device (10) is a portable rectangular body disposed with a display screen (11) on a front surface (10a) thereof, an infrared (IR) image capture unit (30), a wireless call unit (40) and a first SIM card communication unit (50);
wherein the IR image capture unit (30) is set on a rear surface (10b) of the patrol device (10) and composed of a thermal imaging lens (31) and an imaging lens (32), wherein the thermal imaging lens (31) gets a thermal image (11a) while the IR image capture unit (30) performs temperature detection, at the same time the imaging lens (32) obtains a common image (11b), wherein the thermal image (11a), the common image (11b) and a synthesized image (11c) created by the thermal image (11a) and the common image (11b) are synchronously shown on the display screen (11) from top to bottom in turn, wherein users can select and set the images (11a, 11b, 11c) on the display screen (11) by a displaying pattern selected from the group consisting of the thermal image (11a) and the common image (11b) are displayed in parallel, the common image (11b) and the synthesized image (11c) are displayed in parallel, the synthesized image (11c) and the thermal image (11a) are displayed in parallel, and only one image of the thermal image (11a), the common image (11b) or the synthesized image (11c) is displayed;
wherein the wireless call unit (40) consists of a receiver portion (41), a transmitter portion (42) and a talk button (43), wherein the receiver portion (41) is set on an upper part of the front surface (10a) and used for receiving wireless messages, the transmitter portion (42) is arranged at a lower part of the front surface (10a) and the talk button (43a) is disposed on the left side surface (10d), thus users can make a wireless call from the transmitter portion (42) to the base unit (20) by pressing the talk button (43);
wherein the wireless call unit (40) further includes an antenna (44) disposed on the top surface (10e) of the patrol device (10) and used for enhancing strength of signals received by the wireless call unit (40);
wherein the first SIM card communication unit (50) includes a first SIM card (51), wherein when users install a SIM card used in local area as the first SIM card (51) in the first SIM card communication unit (50), image information is transmitted and received through network services in that area, the image information is stored in a secret folder by settings and protected by encryption so that the image information can only be transmitted to a specific cloud host so as to have the image information not be transmitted openly;
wherein the patrol device (10) further includes a second SIM card communication unit (60) used for mounting a second SIM card (61) whose area specification is different from that of the first SIM card (51) mounted in the first SIM card communication unit (50), wherein when the first SIM card (51) mounted in the first SIM card communication unit (50) is unable to be used at different area or locations, the patrol device (10) uses the second SIM card communication unit (60) for connection to network;
wherein the second SIM card communication unit (60) further supports wireless communication standards including Wi-Fi, NFC (Near Field Communication) and Bluetooth;
wherein the patrol device (10) further includes two function key sets (101), one record key (102), one upload button (103), a red light laser pointer (104), a main lens (105), a Radio-frequency identification (RFID) reader (106), a LED (light emitting diode) light (108), a volume control key set (109), a power switch (110), a camera button (111), and an alarm button (112); wherein the function key sets (101) are disposed on the front surface (10a) and under the display screen (11) and able to be set as hot keys by users for control of the patrol device (10); wherein the record key (102) is arranged at the front surface (10a) and under the display screen (11) for users to press the record key (102) to activate recording program and the record key (102) is switched to the on/off button for control of recording after the recording program being activated; wherein the upload button (103) set on the front surface (10a) and under the display screen (11) is used for upload data in specific folder to the designated cloud whenever needed; wherein the red light laser pointer (104) is disposed on the rear surface (10b), located beside the thermal imaging lens (31) and used for users to point a red laser at a measuring point that requires temperature measurement; wherein the main lens (105) is arranged at the rear surface (10b) and located beside the thermal imaging lens (31) for users to capture images; wherein the RFID reader (106) disposed on the rear surface (10b) and located under the thermal imaging lens (31) allows users to get barcode data by sending signals to a tag and reading its response; wherein the LED light (108) is disposed on the rear surface (10b) and located beside the thermal imaging lens (31) for users to light the surroundings; wherein the volume control key set (109) is arranged at the right side surface (10c) and used for users to adjust sound volume of the patrol device (10); wherein the power switch (110) is set on the right side surface (10c) and used for users to turn on/off power of patrol device (10); wherein the camera button (111) is disposed on the right side surface (10c) of the patrol device (10) and used for taking a shot; wherein the alarm button 112 is mounted on the top surface (10*e*) and beside the antenna (44) for users to call for help;

wherein the bottom surface (10*f*) of the patrol device (10) is set with a charging port (14), the charging port (14) is electrically connected to a charging stand (80) for charging the patrol device (10);

wherein the base unit (20) includes at least one computer, at least one external periphery, and one specific transmitter (21);

wherein the patrol device (10) is disposed with a specific port (12) on a bottom surface (10*f*) thereof for electrical connection to the specific transmitter (21) of the base unit for secure data transmission between the patrol device (10) and the base unit (20).

2. The system as claimed in claim 1, wherein a pistol-grip connector (13) is disposed on the rear surface (10*b*) of the patrol device (10); the pistol-grip connector (13) is electrically connected to a pistol-grip guard tour device (70).

3. The system as claimed in claim 2, wherein the guard tour device (70) includes a handle (71), a seat (72), a sensing surface (73) and a connection port (74); the patrol device (10) is electrically connected to the connection port (74) by the pistol-grip connector (13) thereof and is able to be mounted in into the seat (72).

4. The system as claimed in claim 1, wherein the external peripheral of the base unit (20) includes a printer, a mobile phone, and a projector.

5. The system as claimed in claim 1, wherein each side surface (10*c*, 10*d*) of the patrol device (10) is arranged with a slip-resistant portion (15).

* * * * *